United States Patent
Minks et al.

(10) Patent No.: US 7,276,882 B2
(45) Date of Patent: Oct. 2, 2007

(54) REGULATOR CONTROL CIRCUIT AND METHOD

(76) Inventors: Floyd M. Minks, 2700 Partin Settlement Rd., Kissimmee, FL (US) 34744; Jeffrey K. Minks, 2077 Live Oak Blvd., St. Cloud, FL (US) 34772

( * ) Notice: Subject to any disclaimer, the term of this patent is extended or adjusted under 35 U.S.C. 154(b) by 0 days.

(21) Appl. No.: 11/151,690

(22) Filed: Jun. 13, 2005

(65) Prior Publication Data

US 2006/0038541 A1    Feb. 23, 2006

Related U.S. Application Data

(63) Continuation-in-part of application No. 10/698,342, filed on Oct. 31, 2003, now Pat. No. 6,906,480.

(60) Provisional application No. 60/422,717, filed on Oct. 31, 2002.

(51) Int. Cl.
*H02H 7/06* (2006.01)
*H02P 11/00* (2006.01)
*H02P 9/00* (2006.01)
*H02P 9/10* (2006.01)

(52) U.S. Cl. .................. 322/28; 322/24; 322/44; 322/59

(58) Field of Classification Search .................. 322/24, 322/28, 26; 363/161
See application file for complete search history.

(56) References Cited

U.S. PATENT DOCUMENTS

| | | | | |
|---|---|---|---|---|
| 4,117,389 A | * | 9/1978 | Hazumi et al. | 322/47 |
| 4,293,810 A | * | 10/1981 | Wright | 322/28 |
| 4,490,779 A | * | 12/1984 | Minks | 363/48 |
| 4,791,349 A | * | 12/1988 | Minks | 323/266 |
| 6,222,349 B1 | * | 4/2001 | LeRow et al. | 322/34 |
| 6,344,988 B2 | * | 2/2002 | Asai et al. | 363/149 |
| 6,373,230 B2 | * | 4/2002 | Jabaji | 322/28 |
| 6,469,476 B1 | * | 10/2002 | Barrett et al. | 322/29 |
| 6,731,081 B2 | * | 5/2004 | Kusase et al. | 318/140 |
| 2003/0030416 A1 | * | 2/2003 | Fukaya | 322/24 |
| 2004/0251881 A1 | * | 12/2004 | Haydock et al. | 322/24 |

* cited by examiner

*Primary Examiner*—Julio Gonzalez
(74) *Attorney, Agent, or Firm*—Allen, Dyer, Doppelt, Milbrath & Gilchrist, P.A.

(57) ABSTRACT

Switching devices control the rectification and flow of alternating current power from a source such as an alternator to a load such as a battery in response to both the voltage of the battery and a minimum selected time period that is selected to eliminate or reduce an imbalance between various phases or polarities in possible current carrying paths. The selected time period may be constant or a predetermined function of variables such as the speed of the alternator.

5 Claims, 7 Drawing Sheets

1: FULL WAVE DC CURRENT   20A/DIV 200μs/DIV

2: HALF WAVE DC CURRENT   20A/DIV 200μs/DIV

3: OPEN CIRCUIT VOLTAGE   100V/DIV 200μs/DIV

1) CH1   2 Volts/DIV  500 µs /DIV   STATOR LEAD 1.
2) CH2   100 Volts/DIV 500 µs /DIV  STATOR LEAD 2.
3) CH3   100 Volts/DIV 500 µs /DIV  STATOR LEAD 3.
4) CH4   40 Amps/DIV 500 µs /DIV    STATOR LEAD 1.

REGULATOR CONTROL CIRCUIT AND METHOD

CROSS-REFERENCE TO RELATED APPLICATIONS

This application is a continuation in part of U.S. application Ser. No. 10/698,342, filed Oct. 31, 2003, issuing as U.S. Pat. No. 6,906,480 on Jun. 14, 2005, which itself claims the benefit of U.S. Provisional Application No. 60/422,717, filed Oct. 31, 2002, the disclosures of which are hereby incorporated herein in their entireties by reference and commonly owned.

FIELD OF THE INVENTION

The present invention relates to the field of electrical regulators and, in particular to solid state switching thereof.

BACKGROUND OF THE INVENTION

Outboard motors and recreational vehicles such as snowmobiles often have electrical systems including a permanent magnet alternator, a battery, various connected loads, and a solid state combination regulator rectifier to change the alternating current output of the alternator to a controlled DC current for maintaining the required charge on the battery. As these vehicles have become more sophisticated, the required electrical loads have in general increased and there has been a corresponding requirement to increase the current carrying capability of the regulators and increase the amount of current obtainable from a given size or weight alternator. Except in some very low power applications, the regulators are in general full wave rectification from either single phase or three phase permanent magnet alternators. Improvements in the alternator output have come recently from such technology as rare earth magnets. This has resulted in many alternator windings running near the upper limit of a temperature capability of the insulation systems of the magnet wire. Regulators commonly used in this type of system include solid state switches, such as silicon control rectifiers and diodes, used to control the current flow from the alternator to the battery and load. These components and the alternator winding must of course be sized so that when the alternator is producing full output, with the switching devices such as silicon control rectifiers always on when instantaneous circuit polarity is such that they can conduct, that both the alternator and the semi conductor components are within their current capabilities, or stated another way within the temperature capabilities of those components. A problem arises if the design of the regulator allows an imbalance in current between the various phases of a three-phase alternator or the positive and negative half cycles of a single-phase alternator.

It has been observed that a full wave rectified single phase alternator operating at high RPM can maintain as much, and in some cases even slightly more, average current output with one of the polarities disabled. In this extreme example, even though the average current to the battery and load remains approximately the same the average current through the switching device and diode that is still in operation is increased 2 to 1 and the true RMS current or effective heating value of the current through the alternator winding is also drastically increased. The forgoing results from an effective phase shift, resulting in conduction of greater than 180 degrees compared to the open circuit voltage waveform of the alternator. Whether a given combination of alternator and regulator operates with a reasonable balance between the possible conducting paths, i.e. polarity or phases, can be influenced greatly by the connected load and the condition or type of battery used. Typically, the manufacturer of a vehicle cannot control the load and the battery condition. Thus, even if initial testing indicated that components share loads as desired it is often found in vehicles at a later time, particularly where batteries may have been substituted or the original battery type deteriorated, that a severe imbalance in the load occurs between for instance the positive and negative half cycle of a full wave rectified single phase, or between the phases of a three phase alternator.

SUMMARY OF THE INVENTION

Embodiments of the present invention provide a control circuit or method for minimizing or eliminating the above referenced imbalance between various current carrying paths, but at the same time minimizing the effective pulsation in the current supply to the load and battery. This may be done by controlling the operation of the solid state switches not only based on the voltage across the load or battery but also based on a pre-determined gating time and sequence of the switching elements or silicon control rectifiers in the various conducting paths in the regulator rectifier.

BRIEF DESCRIPTION OF THE DRAWINGS

Embodiments of the present invention will become more apparent by referring to the following detailed description and drawings in which.

DETAILED DESCRIPTION OF ALTERNATE EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Prime notation is used to indicate similar elements in alternate embodiments.

Figure 1:
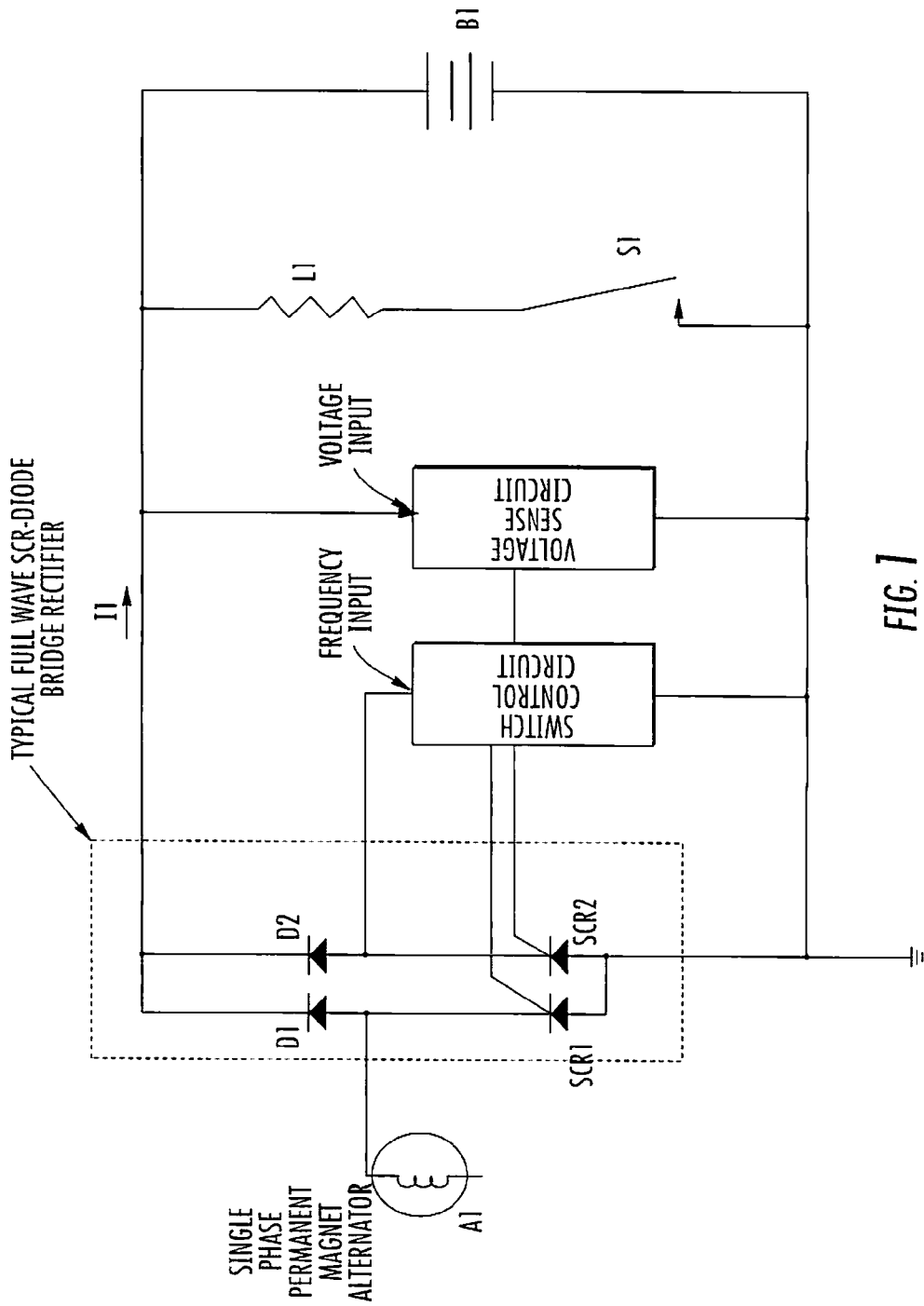
FIG. 1 is a combination circuit diagram and block diagram of one embodiment including a permanent magnet alternator A1 shown as a single winding is connected through rectification and switching components SCR1 SCR2 and D1 and D2 to a load consisting of battery B1 switch S1 and load resistor L1.
Figure 2:
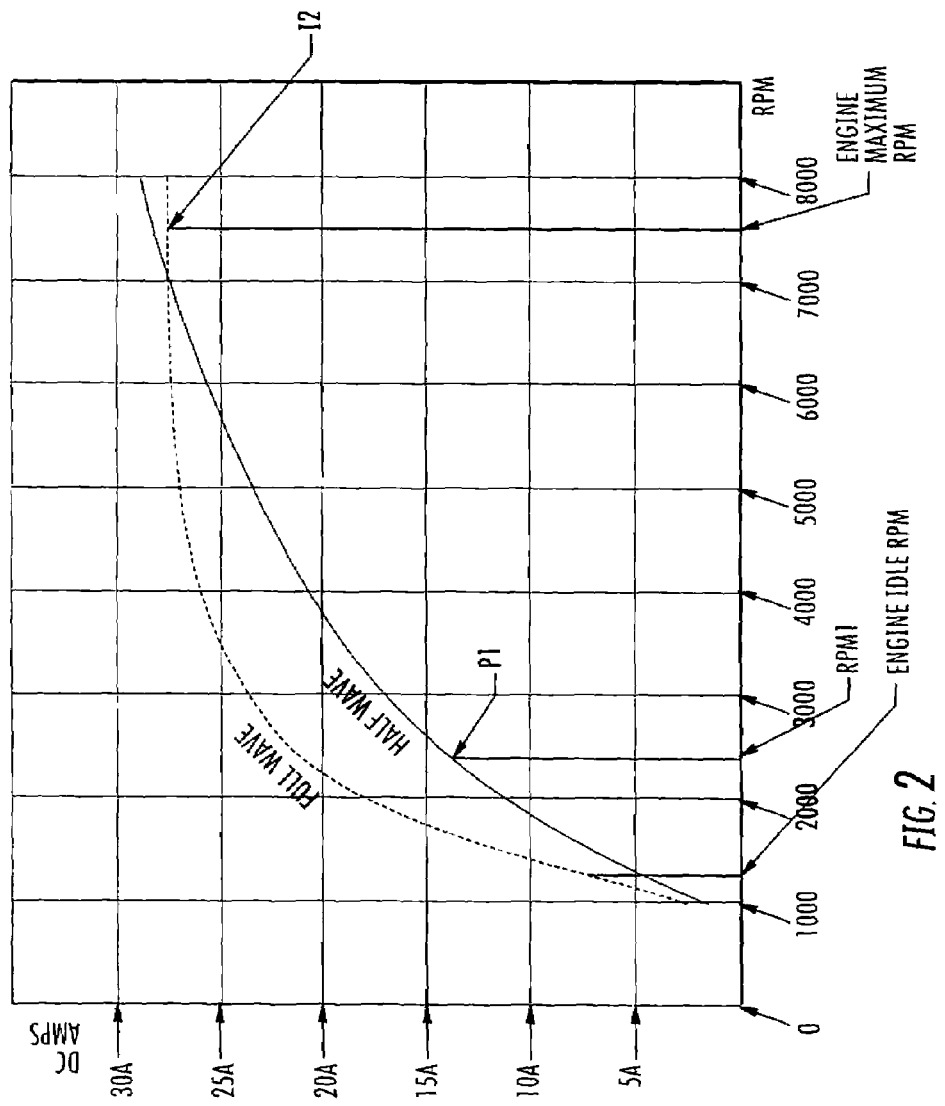
FIG. 2 is a graph of average output current obtainable from the alternator and SCR-diode bridge in FIG. 1, plotted vs. RPM or speed of the alternator.
Figure 3:
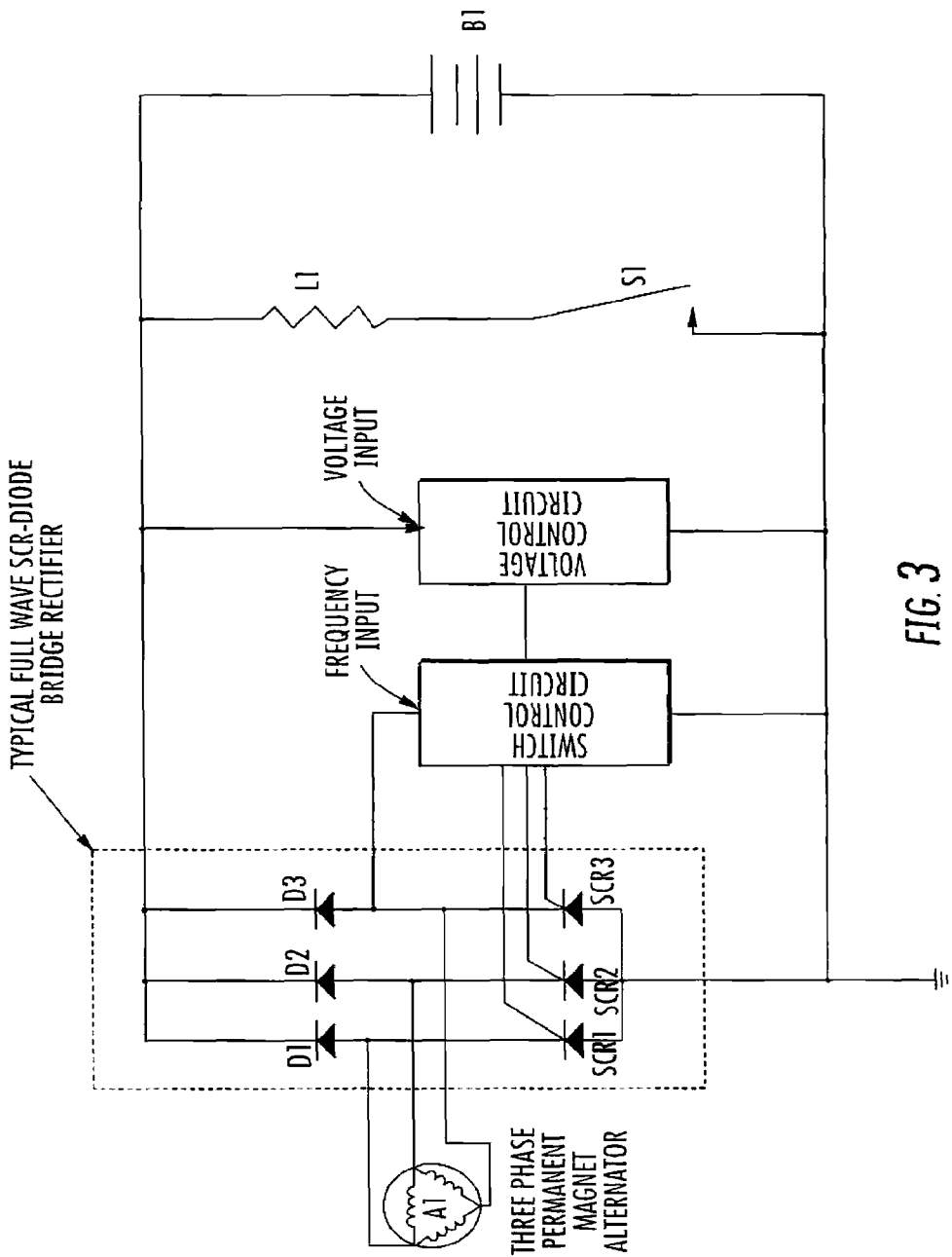
FIG. 3 is an alternate embodiment of FIG. 1 including a three-phase alternator, wherein the alternator is represented as 3 inductive winding, in a delta configuration, with an understanding that other connections such as the three phases Y or various other numbers of phases may be substituted by one skilled in the art within the spirit and teaching of this application, and wherein the three-phase application imbalance in current may arise with either 1 or 2 of the SCR's always on and the remaining 2 or 1 always off, wherein such may be extreme examples realizing that any amount of imbalance can occur short of the current through a possible current path actually being zero.
Figure 4:
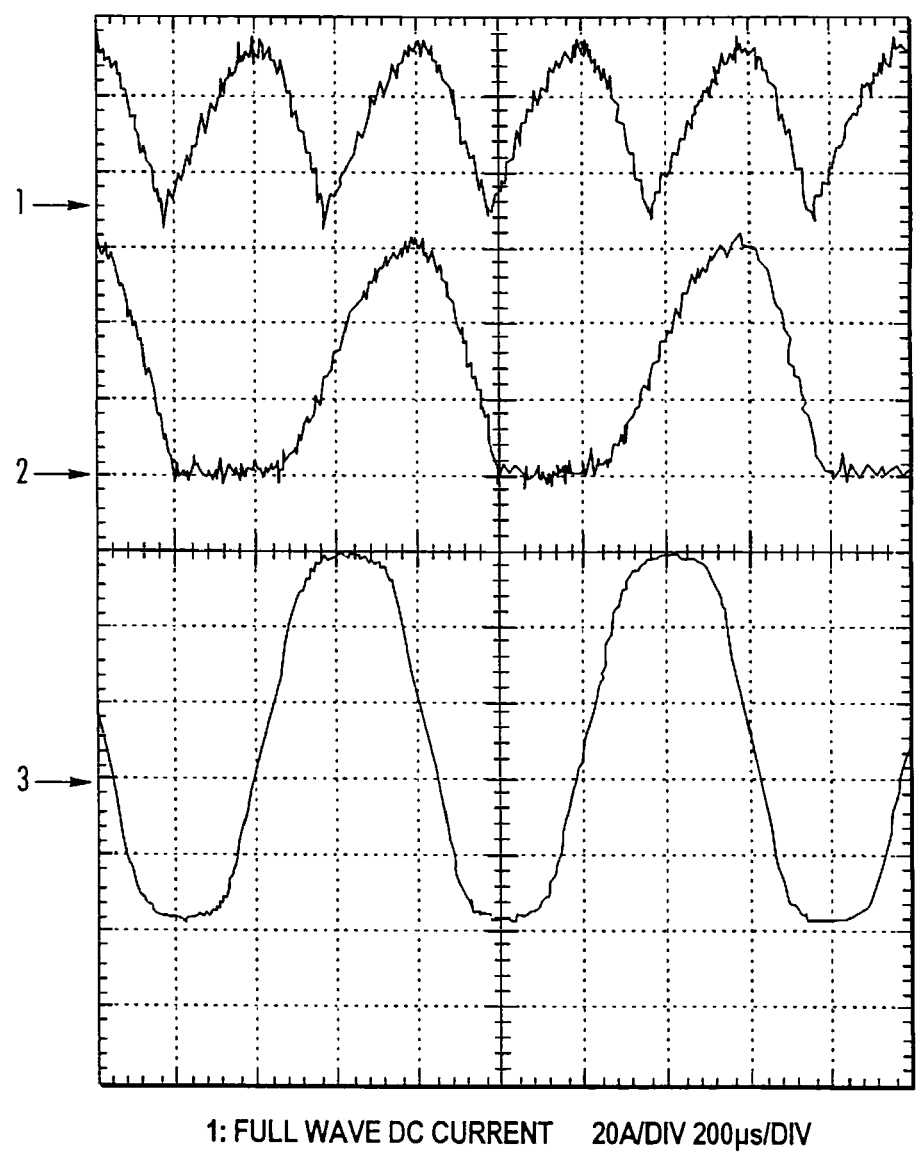
FIG. 4 illustrates three wave forms that are all synchronized with each other, that is with the mechanical rotation of the alternator shaft, which may be typical of an alternator and rectification scheme as described with reference to FIGS. 1 and 2, wherein the bottom curve represents an open circuit voltage of the alternator, the middle curve represents an instantaneous value that is plotted as an average for the half wave curve in FIG. 2, and the top curve represents an instantaneous value full wave rectified that is plotted as an average for the full wave curve of FIG. 2, and wherein the data shown in FIGS. 2 and 4 represent actual values from a production alternator used on a small recreational vehicle, and herein provided as examples, but in no way are to be construed as restrictive to the scope of the invention.

With reference to FIGS. 1 and 3, the solid state switching elements SCR1 and SCR2 are shown as controlled by two circuits shown in a block diagram form. The first being a voltage sense circuit connected to the load and the second being a switch control circuit responsive to the voltage sense circuit to generate control or gate signals for the components SCR1 and SCR2. The voltage sense circuit derives its input from a voltage input connected to the battery positive terminal and a ground connected to the battery negative terminal. Internally the voltage between these terminals is compared to a reference to determine if a battery voltage is above or below the desired level and the output state is changed accordingly. The voltage sense circuit may also contain an over voltage detection circuit which will function, in the case of a voltage greatly above the desired level, to shut down the output for a selected interval. This would be desirable for instance if a battery lead became disconnected. By way of example, the voltage sense circuit may be made sensitive to either the average or the instantaneous value of the battery voltage. Sensing the instantaneous value maximizes the effect of battery lead and battery internal impedances. Battery temperature may also be sensed and used to modify the voltage set point. The switch control circuit responds to the output of the voltage sense circuit and may have additional inputs, such as a frequency input connected to the alternator, and a circuit responsive to the temperature of a selected portion of the regulator so as to reduce or disable the output under an over temperature condition. In previously known circuitry the output of the switch control circuit needed to be only long enough to turn on the switching devices such as the SCR shown. For embodiments of the present invention, herein described by way of example, this portion of the circuit includes means of creating longer output pulses capable of turning on the various switching devices or silicon control rectifiers in a desired sequence over a desired time. The switch control circuit will have internal timing functions to minimize, as will be presently described, any imbalance between the currents handled by SCR1 and SCR2. With continued reference to FIGS. 1 and 2 and in accord with one embodiment of the present invention, the RMS value of the current through the alternator A1 and the semiconductors D1, D2, SCR1 and SCR2 is determined at engine maximum RPM. These provide the RMS values that make up F2 of FIG. 2. A speed, shown as RPM1 of FIG. 2, may then be determined such that below RPM1, in the half wave, or maximum imbalance condition, all component RMS currents are below the maximum values balanced at maximum RPM. Above RPM1, at least one RMS value from maximum RPM balanced values is exceeded. RPM1 may be increased if all components are known to operate below maximum temperature or ratings at maximum engine RPM.

For the single phase system shown in FIG. 1, the time required would be equal to, or slightly greater than one half the period of the open circuit wave form at RPM1. In the simplest embodiment of this invention, this time period could be fixed regardless of RPM. A first level of refinement would be for this pulse duration to be created only at speeds above RPM1. Further refinement would be for the half cycle duration to be automatically applied on a basis computed from the speed of the alternator at that particular instant. The level of refinement necessary would be determined by available safety factors in components and the degree of ripple of fluctuation in the battery voltage that was allowable. Gating on the switching devices for longer than necessary will in general produce higher ripple voltage at the battery terminals. In the three-phase circuit of FIG. 3 the pulse duration being one half of the electrical cycle, would be determined by the number of phases and just sufficient to assure that the conducting paths of all phases were turned on following the initiation by the voltage sense circuit of the turn on of any conducting path.

For the purpose of discussion with reference to FIG. 2, two conditions are assumed. The first condition is that gate signals are supplied to both SCR1 and SCR 2 whenever the voltage across them is of the polarity where they can conduct. This curve is labeled full wave. The second curve assumes that a gate signal is always supplied to SCR 1 whenever the polarity across it is such that it could conduct and that a gate signal is never supplied to SCR 2. The resulting curve is labeled as half wave. The RPM scale on FIG. 2 shows an engine idle RPM and maximum RPM. These should be understood to be the characteristics of an engine mechanically driving the alternator A1 illustrated with reference again to FIG. 1.

Figure 6:
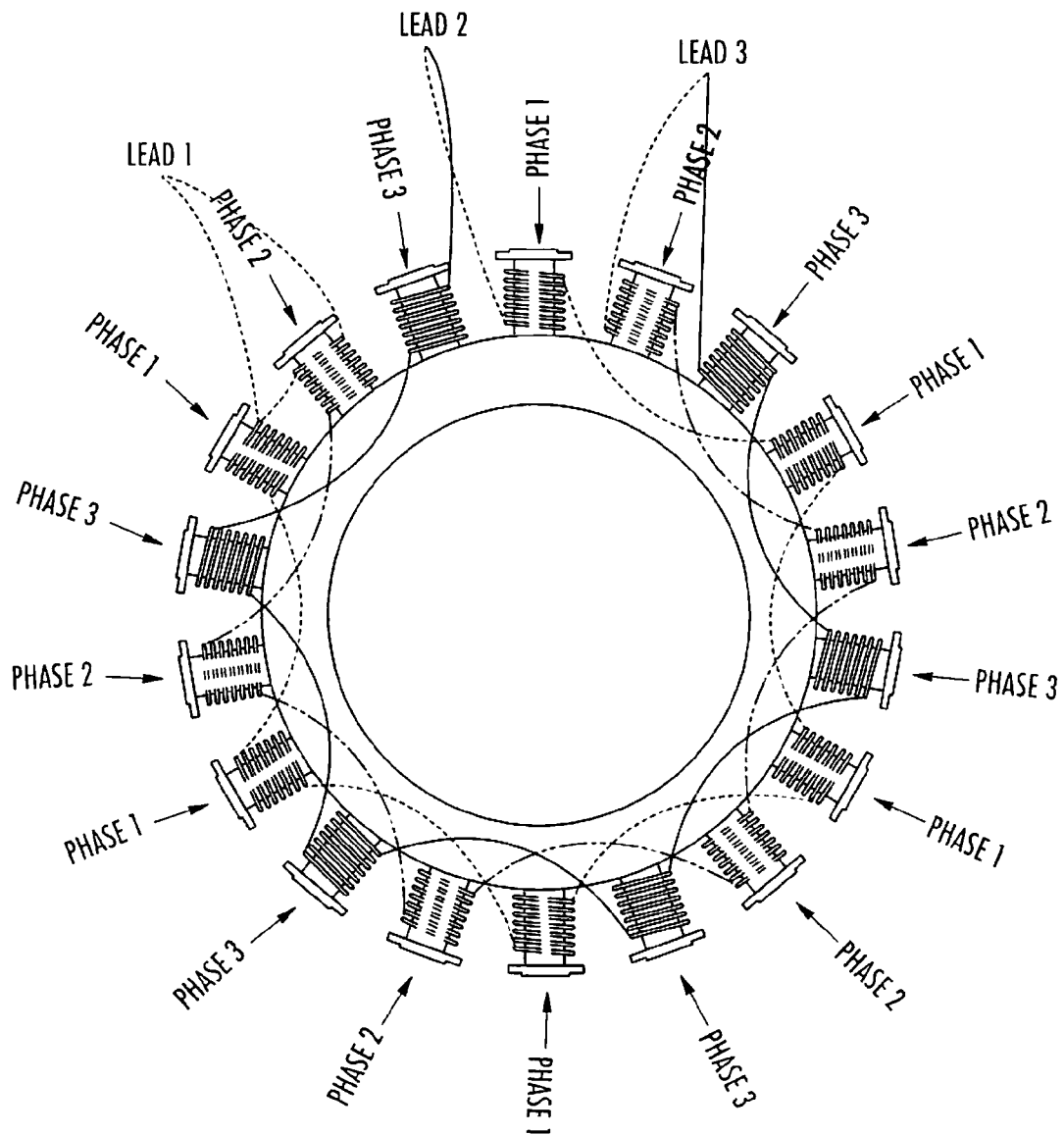
FIG. 6 is a diagrammatical illustration of one embodiment of the present invention including a 3 phase permanent magnet alternator having a stator delta connected wound on 18 poles with each phase wound on every 3rd pole, and a rotor with 12 rare earth magnets.
Figure 7:
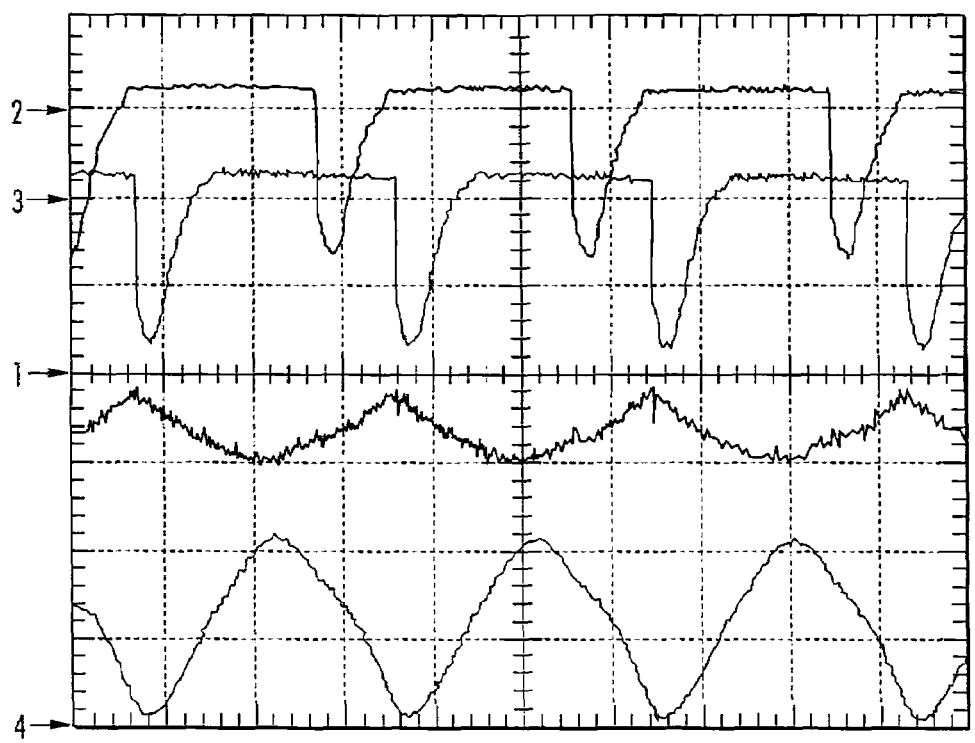
FIG. 7 provides voltage and current responses of an h-bridge rectifier regulator, by way of example, comprising three diodes and 3 SCR's, at mid to high speed (above 4000 rpm), if only one SCR is triggered.

With reference now to FIG. 6, one embodiment of the present invention includes a 3 phase permanent magnet alternator comprising a stator delta connected wound on 18 poles with each phase wound on every 3rd pole, and a rotor with 12 rare earth magnets. With an h-bridge rectifier regulator comprising, by way of example, three diodes and 3 SCR's, at mid to high speed (above 4000 rpm), if only one SCR is triggered on, the SCR will not turn off because the voltage on the cathode (anode is connected to ground) does not go positive with respect to ground, as illustrated with reference to FIG. 7. This phenomenon is very different than the normal operation of the alternator where an AC waveform would be expected to cross zero volts. In an ideal case, the waveform may be positive for the same amount of time that it is negative. It is an extreme case of the phenomenon that allows a half wave rectified alternator to produce as much power as a full wave rectified alternator.

Figure 5:
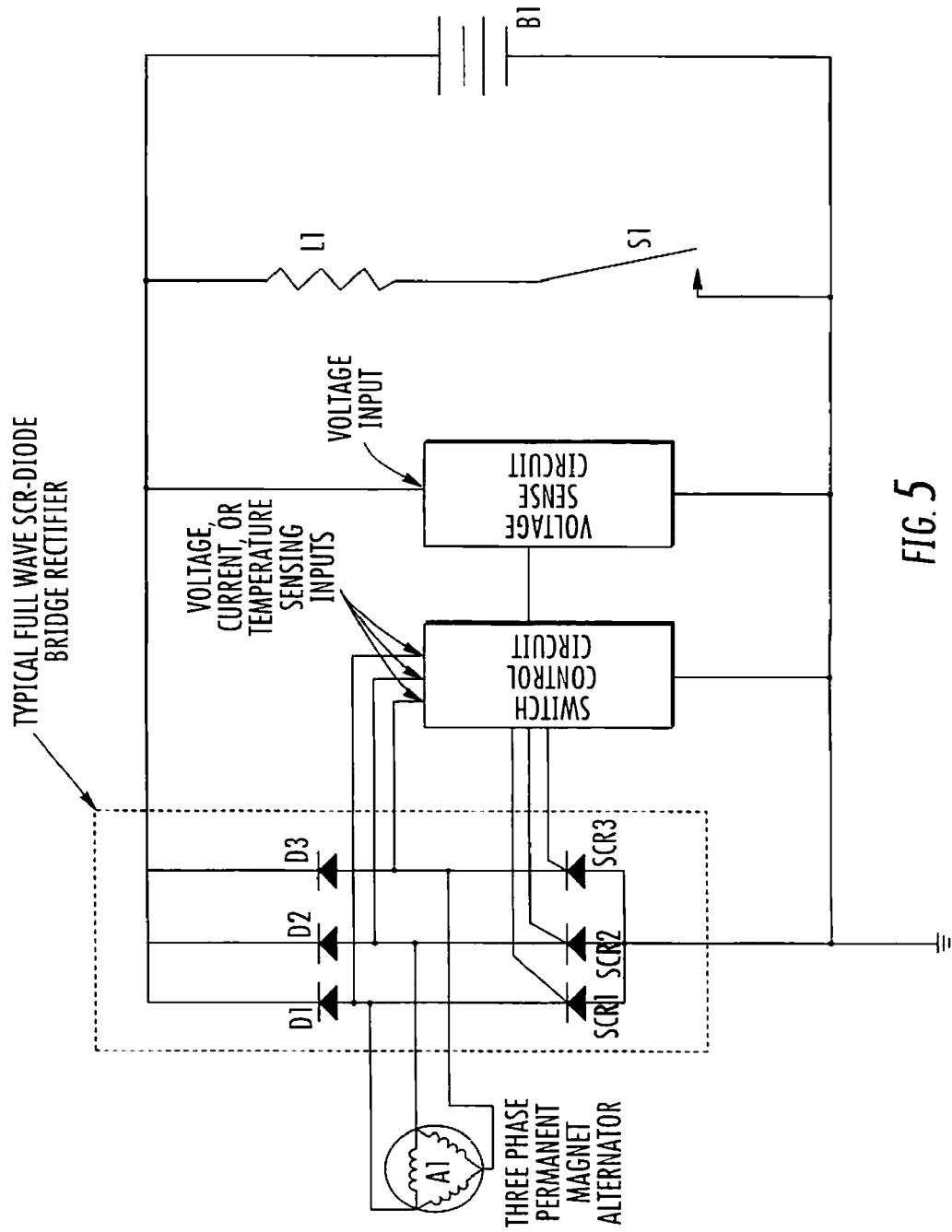
FIG. 5 is an alternate circuit embodiment to FIGS. 1 and 3 for correcting an unregulated output from an alternator, typically seen in an overloading of an SCR and heating in a stator.

The result of this is unregulated output from the alternator is an over loading of the SCR and heating the stator. This will likely cause failure of the SCR or the stator or both. This condition will continue until unless it is corrected. Consider a two-fold solution to this condition. The first part is to identify the condition; the second is to correct it. As illustrated with reference to FIG. 5, identifying the condition can be done in several ways:

First, check the phase's voltage waveforms for a distinguishing characteristic, such as seeing that the voltage has a zero volt crossing. Second, check for a distinguishing characteristic of the phase current waveform such as they bring balanced compared to the other phases. Third, check each SCR and or diode to see that it is not being overheated. Fourth, check the stator for unbalanced heating of the windings.

The second step is to correct the condition may be done in several ways. By way of example, reduce the RPM of the rotor, usually not under the control of the regulator. Second, interrupt the flow of current from the regulator. This would normally require additional components. Third, trigger the other SCR's so that the waveform is changed allowing the SCR to turn off. This would further raise the output of the regulator for a period of time. This would not be normal because the output is likely to be higher than it should be which would cause the voltage sensitive control to not switch on other SCR's.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

That which is claimed is:

1. A voltage regulator circuit comprising;
an alternator driven at variable speed;
a source of AC power operable with the alternator;
a DC load connected for receiving the power; and
at least two switchable rectifying means to rectify and control flow of power from the alternator to the load, wherein the at least two switchable rectifying means each include input control means, and wherein the input control means are responsive to the voltage waveforms of the alternator so that the output of the regulator can be controlled if at least one of switchable rectifying means remain switched on as a result of the waveform of the alternator such that the waveform of the alternator is changed by switching on at least one other switchable rectifying means allowing all switchable rectifying means to be switched off.

2. The circuit of claim 1, wherein the control means is responsive to current waveforms of the alternator.

3. The circuit of claim 1, wherein the control means is responsive to a temperature of the rectifying means.

4. The circuit of claim 1, wherein the control means is responsive to a temperature of windings of the alternator.

5. The circuit of claim 1, wherein the waveform is changed by interrupting a flow of current from the regulator.

* * * * *